(12) United States Patent
Sait et al.

(10) Patent No.: US 9,106,565 B2
(45) Date of Patent: Aug. 11, 2015

(54) LOOP AVOIDANCE FOR EVENT-DRIVEN VIRTUAL LINK AGGREGATION

(71) Applicant: International Business Machines Corporation, Armonk, NY (US)

(72) Inventors: Tamanna Z. Sait, San Jose, CA (US); Venkatesan Selvaraj, Sunnyvale, CA (US); Shoou J. Yiu, Los Altos, CA (US); Yi Xia, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/734,631

(22) Filed: Jan. 4, 2013

(65) Prior Publication Data
US 2014/0195694 A1    Jul. 10, 2014

(51) Int. Cl.
*G06F 15/173* (2006.01)
*H04L 12/705* (2013.01)

(52) U.S. Cl.
CPC .................................. *H04L 45/18* (2013.01)

(58) Field of Classification Search
USPC .................................. 709/203, 217, 239, 223
See application file for complete search history.

(56) References Cited

U.S. PATENT DOCUMENTS

| 8,213,296 | B2 | 7/2012 | Shannon et al. | |
| 2009/0086632 | A1* | 4/2009 | Folkes et al. | 370/232 |
| 2011/0022725 | A1* | 1/2011 | Farkas | 709/238 |

* cited by examiner

*Primary Examiner* — El Hadji Sall
(74) *Attorney, Agent, or Firm* — Sherman IP LLP; Kenneth L. Sherman; Steven Laut

(57) ABSTRACT

Embodiments of the invention relate to virtual link aggregation. One embodiment includes forming one or more virtual links using physical links connecting a first networking element, a second networking element and a third networking element. A first trigger status indication is used for blocking network traffic for avoiding traffic loops occurring over the one or more virtual links.

16 Claims, 16 Drawing Sheets

LOOP AVOIDANCE FOR EVENT-DRIVEN VIRTUAL LINK AGGREGATION

BACKGROUND

Field of the Invention

The present invention relates to network switches and switching, and more particularly, this invention relates to loop avoidance for event-driven virtual link aggregation.

In a data center comprising one or more access switches, each access switch connects two aggregation switches for redundancy. Link aggregation uses available bandwidth across a switch boundary at an aggregation layer.

BRIEF SUMMARY

Embodiments of the invention relate to virtual link aggregation. One embodiment includes forming one or more virtual links using physical links connecting a first networking element, a second networking element and a third networking element. A first trigger status indication is used for blocking network traffic for avoiding traffic loops occurring over the one or more virtual links.

Another embodiment comprises a virtual aggregation link system. The system includes a first aggregation switch. A second aggregation switch is coupled to the first aggregation switch with a first link. At least one access switch is coupled to the first aggregation switch with a second link and the second aggregation switch with a third link. The first access switch establishes a first virtual link with each one of the first aggregation switch and the second aggregation switch. A first traffic management module is coupled with the first aggregation switch. The first traffic management module manages networking traffic from the first aggregation switch based at least in part on a first trigger status, and determines the first trigger status based at least in part on establishing of the first virtual link.

Other aspects and embodiments of the present invention will become apparent from the following detailed description, which, when taken in conjunction with the drawings, illustrate by way of example the principles of the invention.

DETAILED DESCRIPTION

Figure 1:
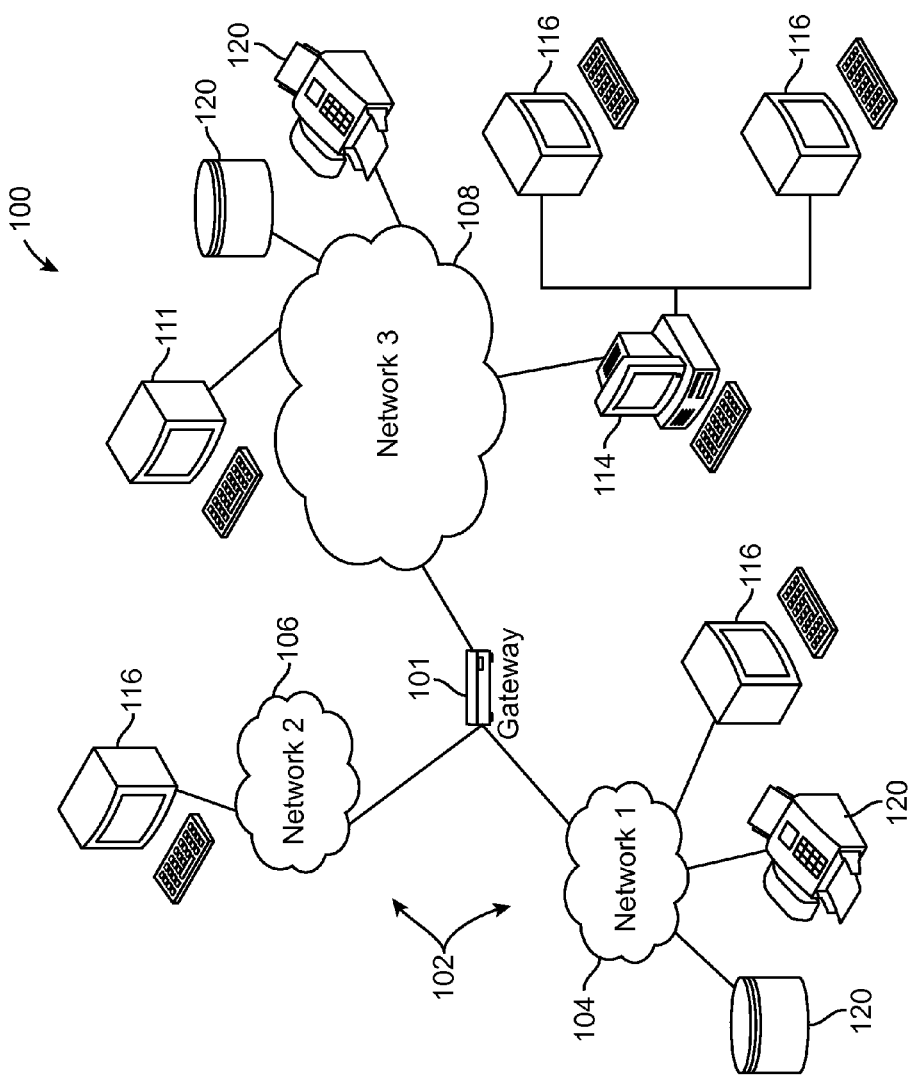
FIG. 1 is a network architecture, in accordance with one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be enhanced through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

Figure 2:
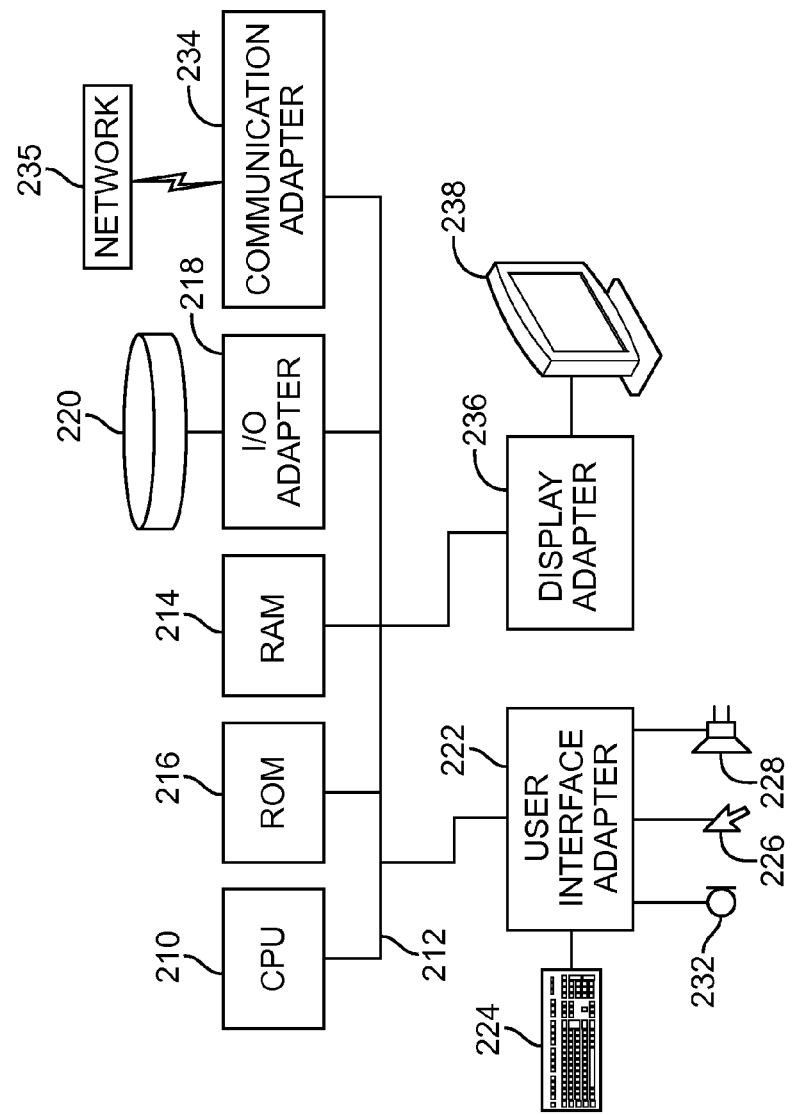
FIG. 2 shows a representative hardware environment that may be associated with the servers and/or clients of FIG. 1, in accordance with one embodiment of the invention.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
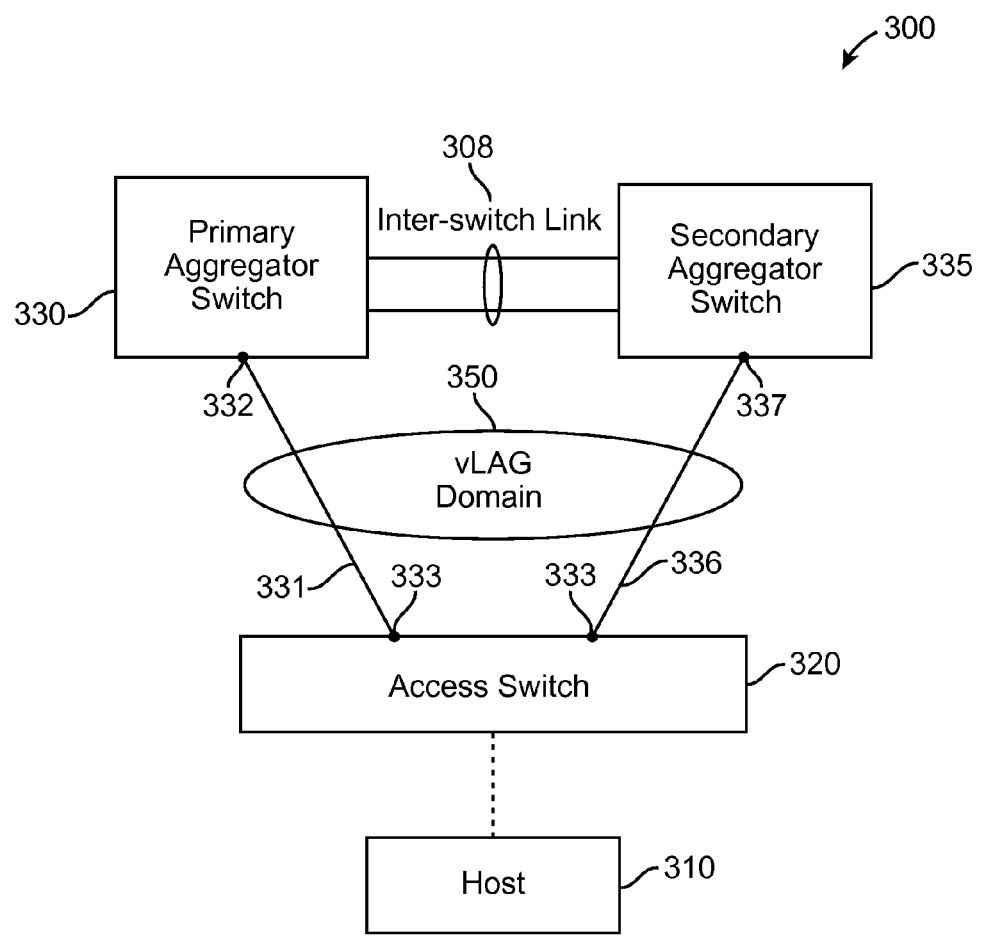
FIG. 3 is a diagram of an example data center system, in which an embodiment of the invention may be implemented.

FIG. 3 is a diagram of an example data center system 300, in which an embodiment of the invention may be implemented. An access switch 320 is connected to two aggregation switches for redundancy, for example, primary switch 330 and secondary switch 335. The primary aggregator switch 330 includes many network ports 332, the secondary aggregator switch 335 includes many network ports 337, and the access switch includes many network ports 333.

Virtual link aggregation group (vLAG) is a feature that uses all available bandwidth without sacrificing redundancy and connectivity. Link aggregation is extended by vLAG across the switch boundary at the aggregation layer. Therefore, an access switch 320 has all uplinks in a LAG, while the aggregation switches 330, 335 cooperate with each other to maintain this vLAG. The vLAG domain 350 comprises virtual links to the primary aggregator switch 330 and the secondary aggregator switch 335 that may comprise, for example, combinations of physical links 331 and 336 to establish virtual links.

Since vLAG is an extension to standard link aggregation, layer 2 and layer 3 features may be supported on top of vLAG. In the system 300 shown in FIG. 3, both primary aggregator switch 330 and secondary aggregator switch 335 are connected with an inter-switch link (ISL) 308. When the host 310 (e.g., an Internet Protocol (IP) multicast receiver) connected to the access switch 320 sends network traffic (e.g., via a packet), the packet is forwarded to one of the aggregator switches (either primary 330 or secondary 335).

In the system 300, loop avoidance protocols such as Spanning Tree Protocol (STP) are used to break the loop created by two aggregation switches (e.g., primary aggregator switch 330 and secondary aggregator switch 335) by blocking one side of the connection. The blocking of one side of the connections results in a 50% reduction of the available bandwidth between the rack layer and aggregation layer.

Figure 4:
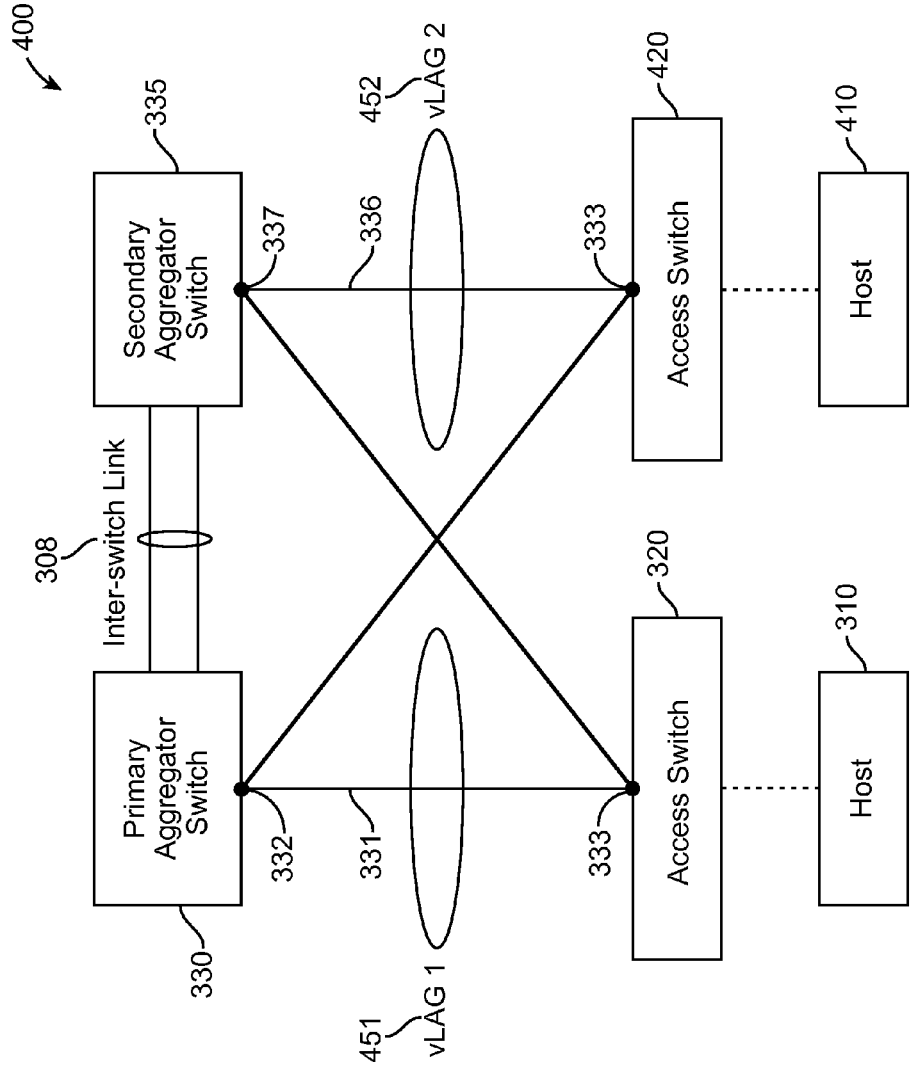
FIG. 4 is a diagram of another example data center system, in which an embodiment of the invention may be implemented.

FIG. 4 is a diagram of an example data center system 400, in which an embodiment of the invention may be implemented. System 400 includes an additional access switch 420, host 410 and includes one or more vLAGs, such as vLAG 1 451 and vLAG 2 452. In system 400, duplicate networking traffic may be received by the access switch 320 from the access switch 420 when the aggregation switches (primary aggregator switch 330 and secondary aggregator switch 335) are not cooperating properly to establish a vLAG.

Figure 5:
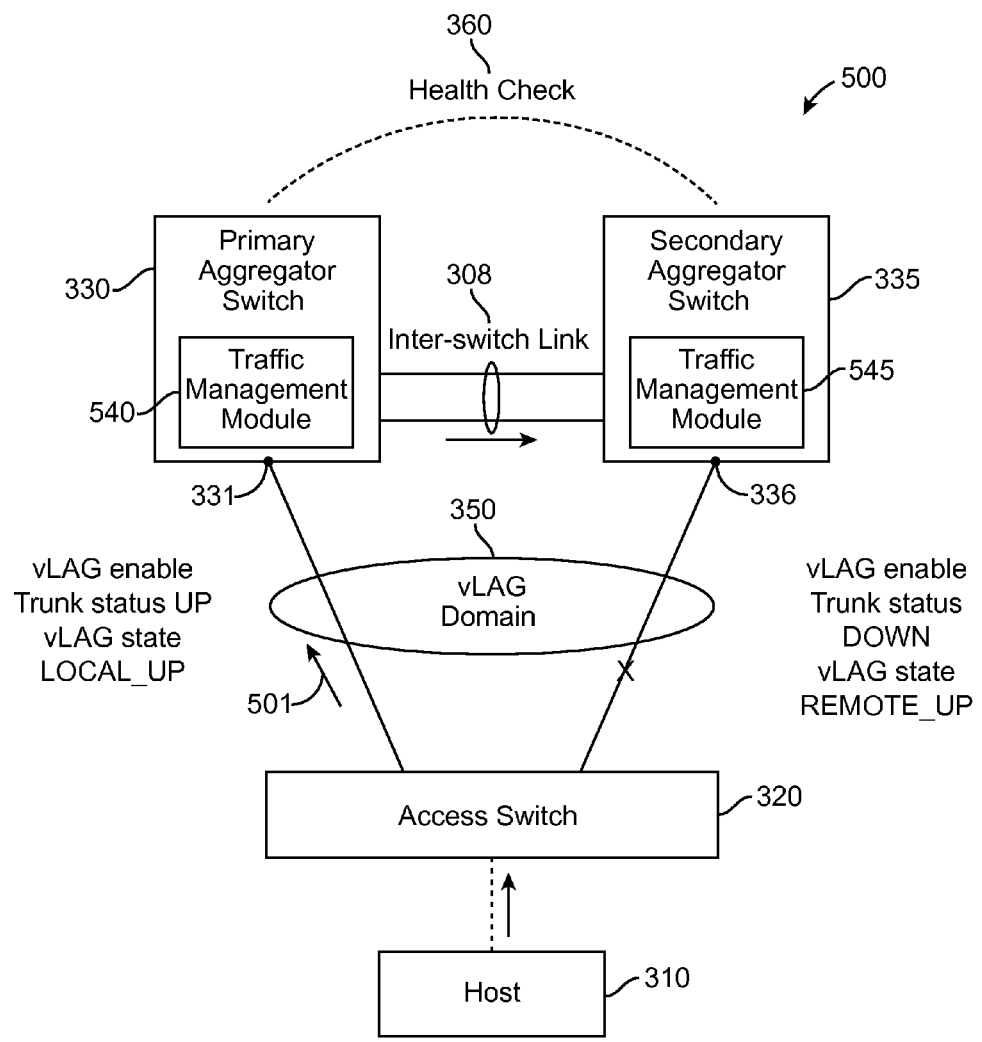
FIG. 5 is a block diagram of a system shown for one example scenario, according to one embodiment of the invention.

FIG. 5 shows a system 500 for one system scenario, such as a data center, according to one embodiment of the invention that avoids network traffic loops without reduction of available bandwidth in the system 500. In one embodiment, in system 500 the primary aggregator switch 330 includes a traffic management module 540 and the secondary aggregator switch 335 includes a traffic management module 545. In one example, the traffic management modules 540/545 avoid networking traffic loops in system 500 in the absence of loop avoidance protocol such as STP.

In one embodiment, for both static trunk and dynamic trunk of system 500, regardless of whether the trunk is up or down, once the trunk is configured/added into a vLAG via the vLAG domain 350, the access switch 320 will always see a single trunk from the primary and secondary aggregation switches 330 and 335. In one example, for the network traffic received from the uplink trunk, the access switch 310 never sends the network traffic back to the uplink trunk. Static trunk supports this naturally. For dynamic trunk, a vLAG switch (e.g., primary aggregator switch 330 or secondary aggregator switch 335) uses a reserved vLAG system media access control (MAC) once to configure a link aggregate control protocol (LACP) key into a vLAG.

In one embodiment, if an established vLAG is disabled in one vLAG switch (e.g., primary aggregator switch 330 or secondary aggregator switch 335), the underlying trunk recovers to a normal trunk and will be placed in a network traffic forwarding state. On the peer vLAG switch, however, the underlying trunk is also placed in a network traffic forwarding state. This operation would cause a loop when STP is not available (e.g., off/disabled/etc.). In one example when a vLAG is disabled, a loop warning message is displayed (e.g., on a terminal/display of a client or server, etc.) and the customer/user will need to confirm the operation (this is the only case where a vLAG cannot operate on the loop because the vLAG instance is disabled on the vLAG switch).

In one embodiment, the traffic management module 540/545 uses an egress trigger for breaking the networking traffic loop. After a vLAG formed, underlying trunks on both vLAG switches (primary aggregator switch 330 and secondary aggregator switch 335) are placed in a network traffic forwarding state. The network traffic received from the peer vLAG switch (through an ISL 308 trunk) should never be forwarded to a local underlying trunk (because the peer switch must already forward the network traffic to the access switch 310). In one example, the traffic management modules 540/545 install an egress trigger if a vLAG is formed and uninstall the egress trigger if a vLAG is not formed. In one example, when the egress trigger is installed, a trigger status may be determined to be enabled/installed. When the egress trigger is uninstalled, a trigger status may be determined to be disabled/uninstalled. In one embodiment, the traffic management module 540/545 determines the egress trigger status.

In one embodiment, the traffic management module 540/545 installs an egress trigger before a peer vLAG switch places an underlying trunk in a network traffic forwarding state. Otherwise, the access switch 310 may receive the network traffic that it sent out for a short period.

In the example scenario shown in FIG. 5, a vLAG instance is enabled on both the primary aggregator switch 330 and the secondary aggregator switch 335. The underlying trunk on the primary aggregator switch 330 is UP (i.e., the vLAG state is LOCAL_UP). The underlying trunk on the secondary aggregator switch 335 is DOWN (i.e., the vLAG state is REMOTE_UP). In this example, the network traffic from the access switch 320 always takes the path from the access switch 320 to the primary aggregator switch 330 (as indicated by arrow 501), and there no network traffic loop will arise.

Figure 6:
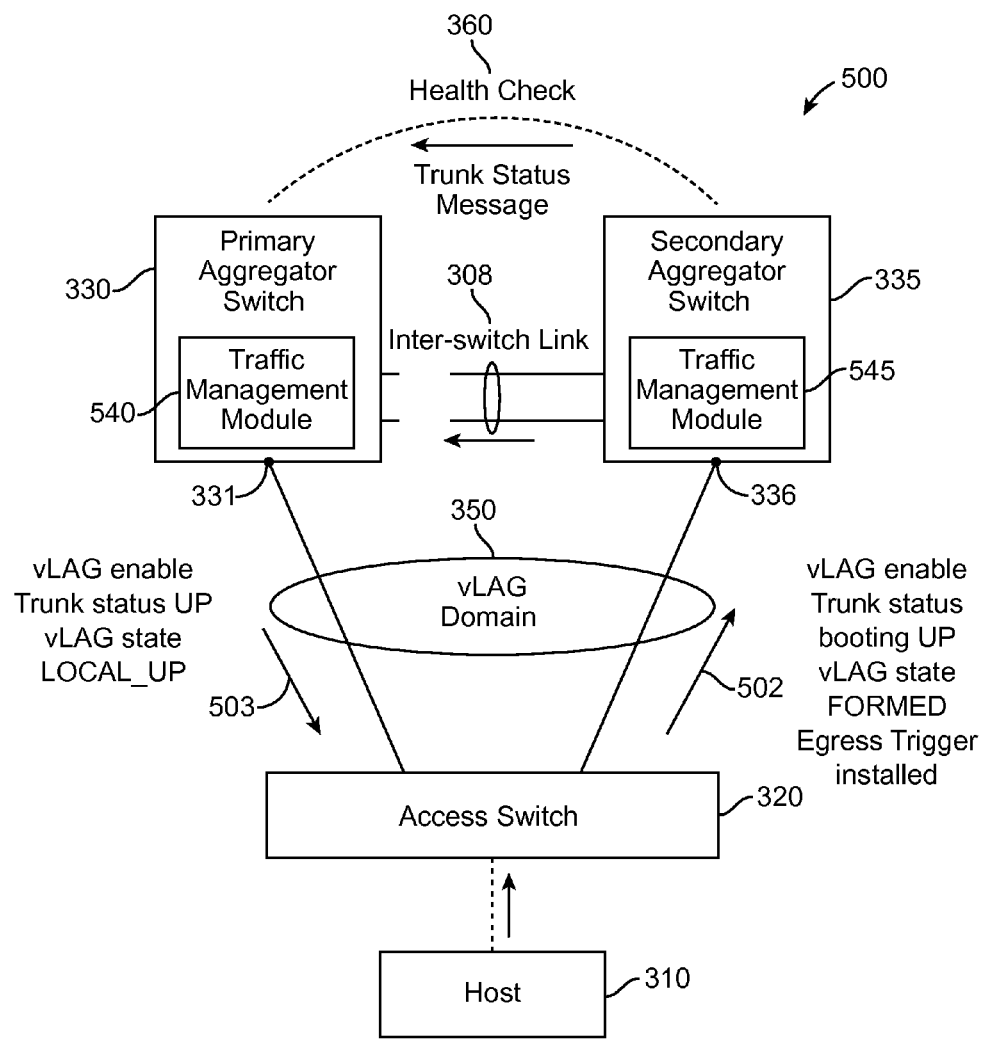
FIG. 6 is a block diagram of the system of FIG. 5 shown for another example scenario, according to one embodiment of the invention.

FIG. 6 is a block diagram of the system of FIG. 5 shown for another example scenario where the temporary loop can happen. In this example, the underlying trunk on the secondary aggregator switch 335 is starting up. The vLAG state on the secondary aggregator switch 335 moves to FORMED and the underlying trunk is placed to a forwarding state. The traffic management module 545 installs an egress trigger to block network traffic received from the ISL 308 to the underlying trunk. The secondary aggregator switch 335 sends a trunk status message to the primary aggregator switch 330. In this example, some of the network traffic will choose the path from the access switch 320 to the secondary aggregator switch 335 as indicated by arrow 502. In one embodiment, before the primary aggregator switch 330 receives the trunk status message, network traffic will be forwarded to the primary aggregator switch 330 because there is no egress trigger deployed by the traffic management module 545. Therefore, the network traffic is forwarded from the underlying trunk to the access switch 320 as indicated by the arrow 503.

Figure 7:
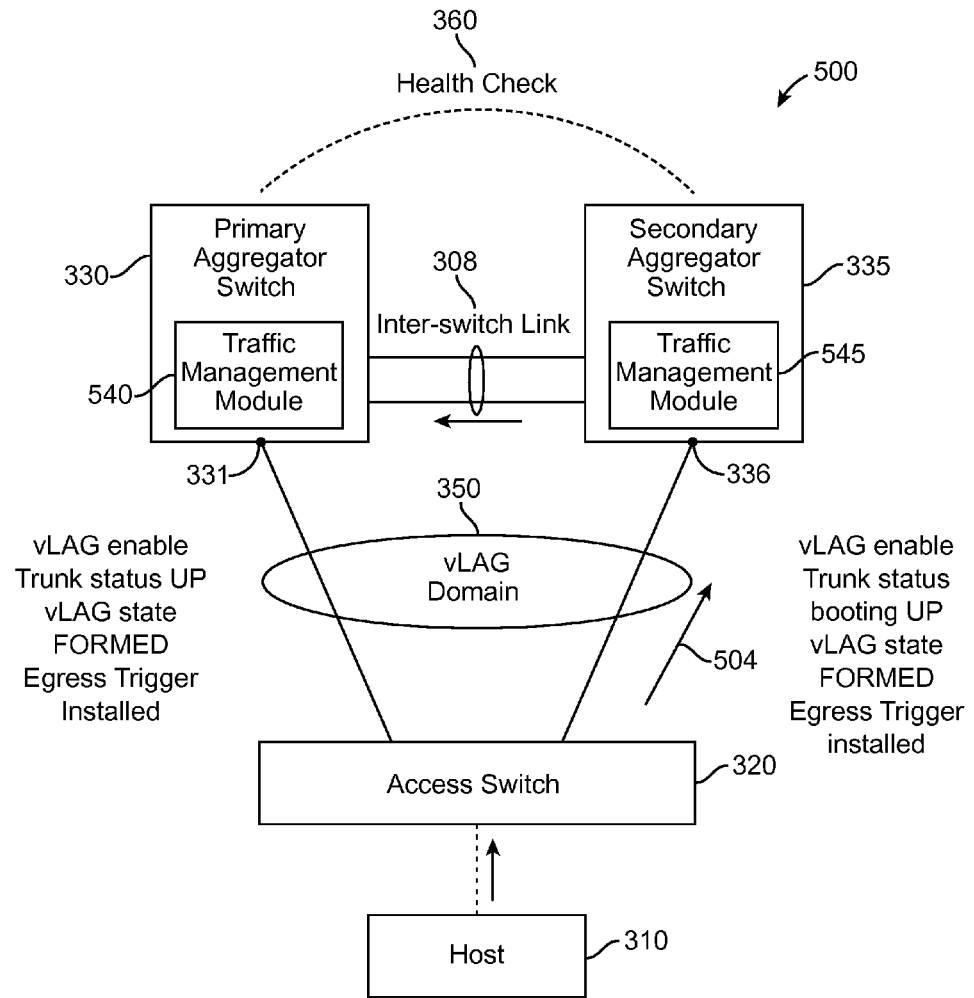
FIG. 7 is a block diagram of a system of FIG. 5 shown for yet another example scenario, according to one embodiment of the invention.

FIG. 7 is a block diagram of a system of FIG. 5 shown for yet another example scenario, according to one embodiment of the invention. In this example, until the primary aggregator switch 330 receives a trunk status message and changes its vLAG state to FORMED, the traffic management modules 540 and 545 install egress triggers. The network traffic flows from the access switch 320 to the secondary aggregator switch 335 as indicated by the arrow 504. In this example, the access switch 320 never receives the network traffic that it has sent out.

In order to avoid this short time period of looping of network traffic, first the vLAG switch will send a trunk status message, and after it receives the acknowledgement from the peer switch (or ISL 308 DOWN indication), then the vLAG switch places its underlying trunk to the forwarding state.

Figure 8:
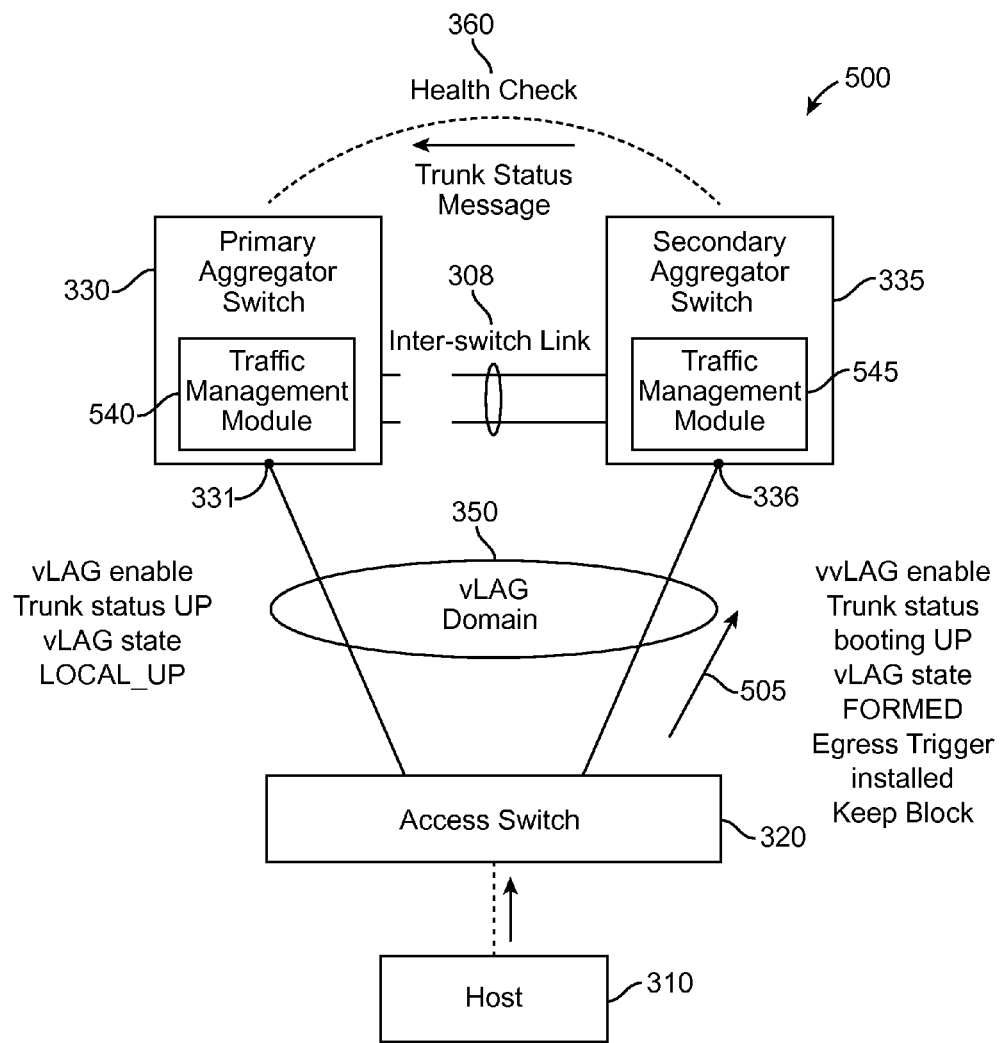
FIG. 8 is a block diagram of a system of FIG. 5 shown for still another example scenario, according to one embodiment of the invention.

FIG. 8 shows a block diagram of a system of FIG. 5 for still another example scenario, according to one embodiment of the invention. In this example, a vLAG instance is enabled on both the primary aggregator switch 330 and the secondary aggregator switch 335. The underlying trunk on the primary aggregator switch 330 is UP (i.e., the vLAG state is LOCAL_UP). The underlying trunk on the secondary aggregator switch 335 is starting up (i.e., the vLAG state is FORMED).

As the underlying trunk on the secondary aggregator switch 335 is starting up, the vLAG state on the secondary aggregator switch 335 changes to FORMED, but the underlying trunk does not have its status changed to a forwarding state. The traffic management module 545 installs an egress trigger to block traffic received from the ISL 308 to the underlying trunk. The secondary aggregator switch 335 sends a trunk status message to the primary aggregator switch 330. Some of the network traffic will choose the path from the access switch 320 to the secondary aggregator switch 335 as indicated by the arrow 505, but this network traffic is dropped due to the trunk being blocked by the egress trigger.

Figure 9:
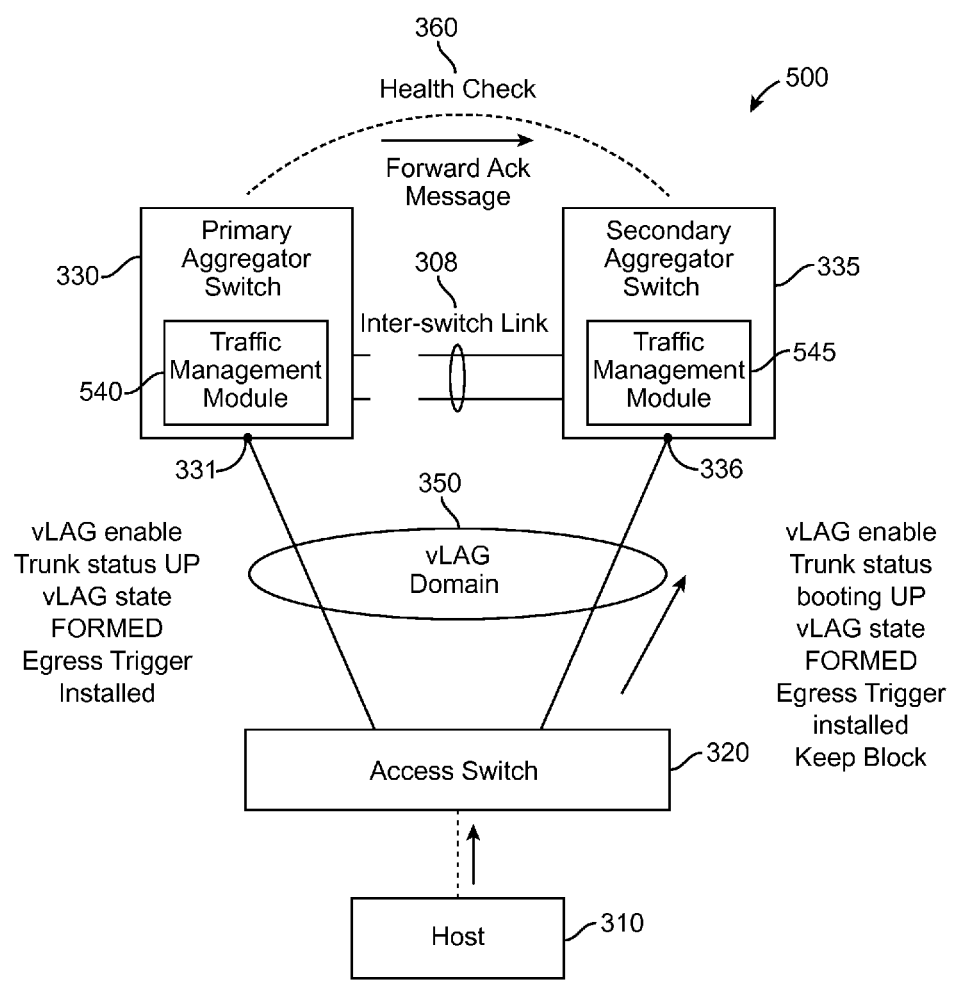
FIG. 9 is a block diagram of a system of FIG. 5 shown for another example scenario, according to one embodiment of the invention.

FIG. 9 is a block diagram of a system of FIG. 5 shown for another example scenario, according to one embodiment of the invention. In this follow up scenario from FIG. 8, the primary aggregator switch 330 received trunk status message from the secondary aggregator switch 335 and changes its vLAG state to FORMED. In this example, the egress trigger is installed by the traffic management module 540. The primary aggregator switch 330 sends back a forward acknowledgement (ACK) message to the secondary aggregator switch 335.

Figure 10:
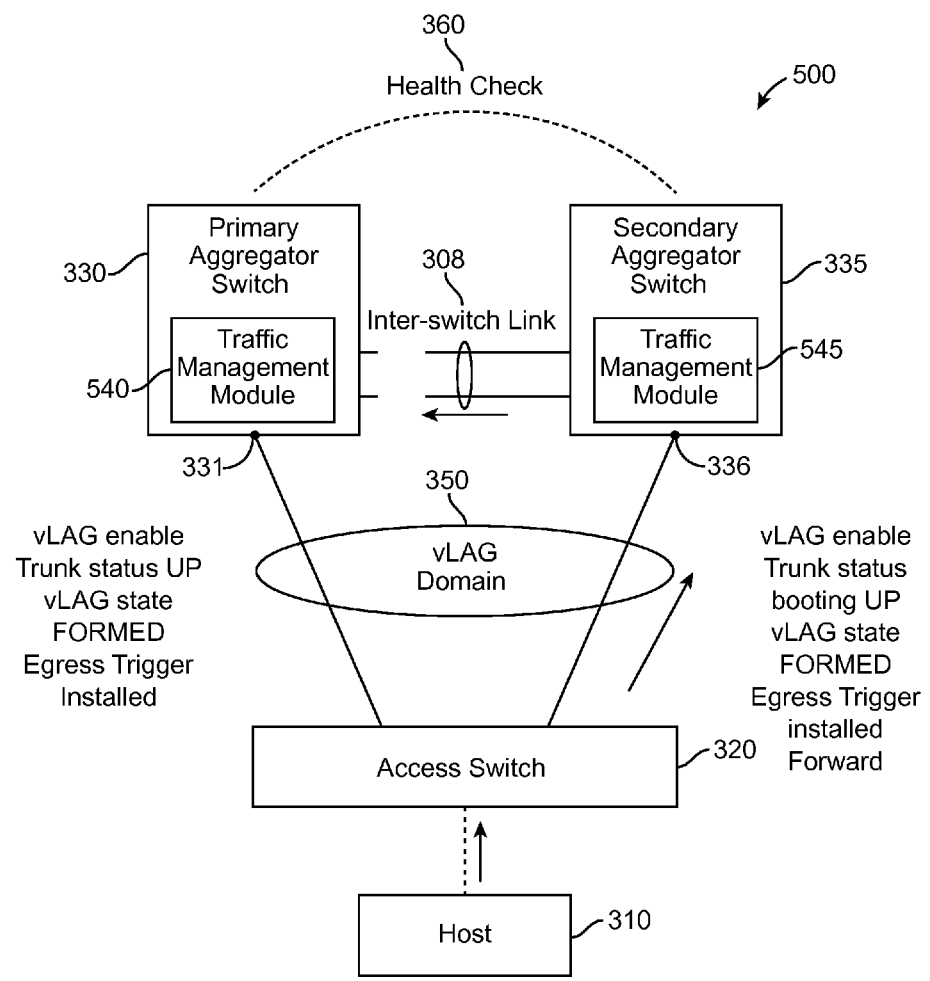
FIG. 10 is a block diagram of a system of FIG. 5 shown for yet another example scenario, according to one embodiment of the invention.

FIG. 10 is a block diagram of a system of FIG. 5 shown for yet another example scenario, according to one embodiment of the invention. In this follow up scenario from FIG. 9, after the secondary aggregator switch 335 receives the forward ACK message, the underlying trunk is placed in a forwarding state. In this example, because the primary aggregator switch 330 has an egress trigger installed by the traffic management module 540, there is no network traffic loop. In this example, the time that the network traffic is lost is short.

In one embodiment, if an ISL 308 failure occurs, then the secondary aggregator switch 335 will trigger health check 360. In one example, the health check has two results: 1) Peer switch is present: if the peer switch is present, then the secondary aggregator switch 335 shuts down all of its vLAG ports, such as networking ports 336. Shutting down all the vLAG ports can prevent the access switch 320 from sending out traffic to the vLAG ports; 2) Timeout will occur: the secondary aggregator switch 335 places all of the vLAG ports in a forwarding state.

In one embodiment, if the ISL 308 comes back up, then the traffic management module 545 checks the vLAG ports ADMIN state. If the vLAG ports are ADMIN UP, then the vLAG ports are enabled. Afterwards, the selector process and vLAG formation process are performed.

In one embodiment, during boot up of the vLAG, all of the network ports in the vLAG instances are kept operationally down until the configuration is applied and the ISL 308 is up.

Figure 11:
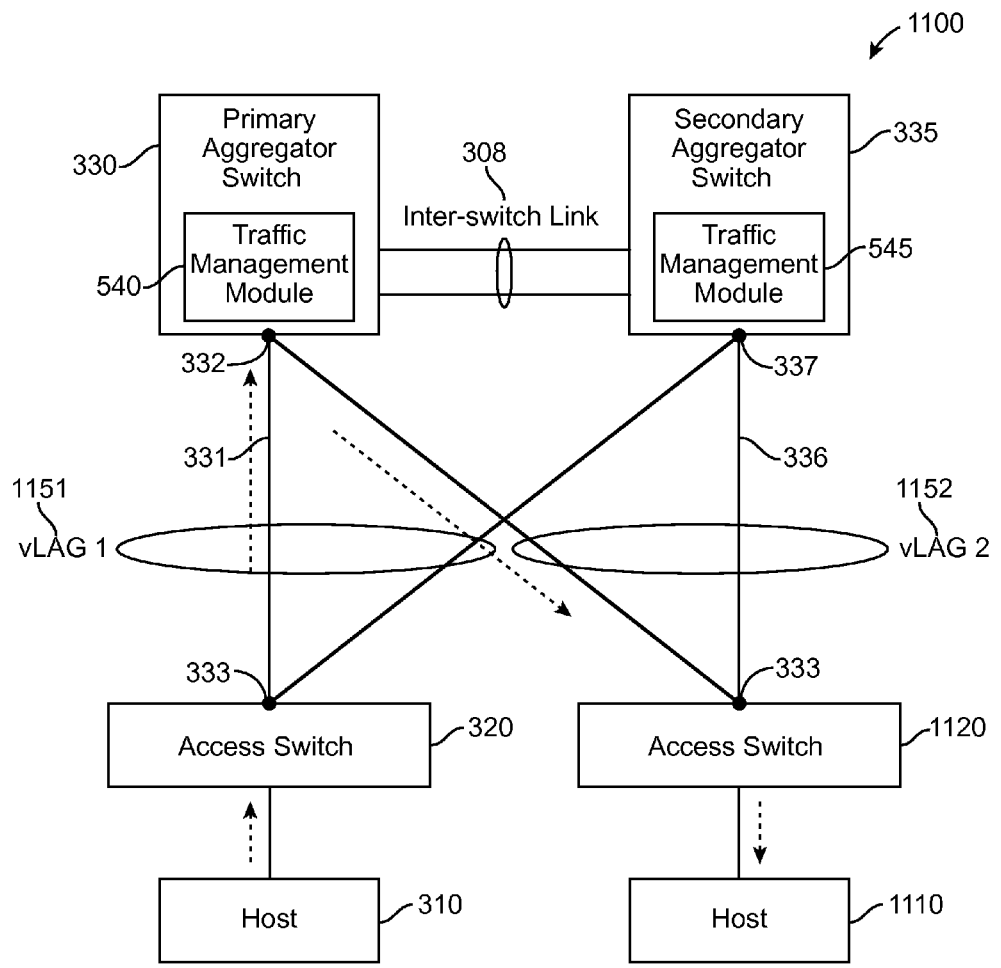
FIG. 11 is a block diagram of another system shown for one example scenario, according to one embodiment of the invention.

FIG. 11 is a block diagram of another system shown for one example scenario, according to one embodiment of the invention. In system 1100, an additional access switch 1120 and host 1110 are added to a system, such as system 500. In one embodiment, multiple vLAGs may be formed in system 1100, such as vLAG 1 1151 and vLAG 2 1152. In one example scenario, the network traffic flowing from the host 310 to the host 1110 uses a path from the access switch 320 to the primary aggregator switch 330, to the access switch 1120 and then to host 1110 (as indicated by the dashed lines) before reloading the primary aggregation switch 330.

Figure 12:
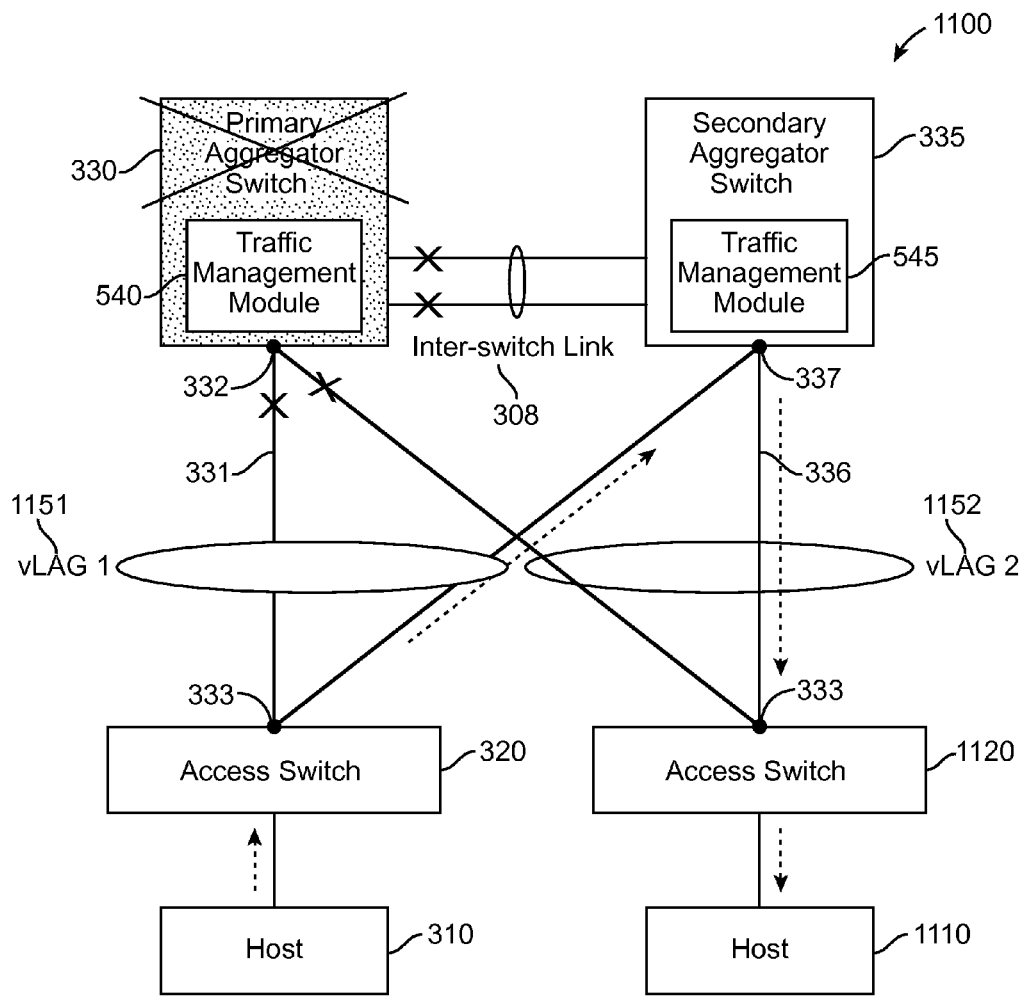
FIG. 12 is a block diagram of the system of FIG. 11 shown for another example scenario, according to one embodiment of the invention.

FIG. 12 is a block diagram of the system of FIG. 11 shown for a follow up example scenario, according to one embodiment of the invention. In this example, after the primary aggregator switch 330 powers down, the network traffic uses the dashed line path in as shown in FIG. 12. In this example, all of the underlying logical aggregation group (LAG) in the secondary aggregator switch 335 will enter a LOCAL_UP state and maintain forwarding status.

Figure 13:
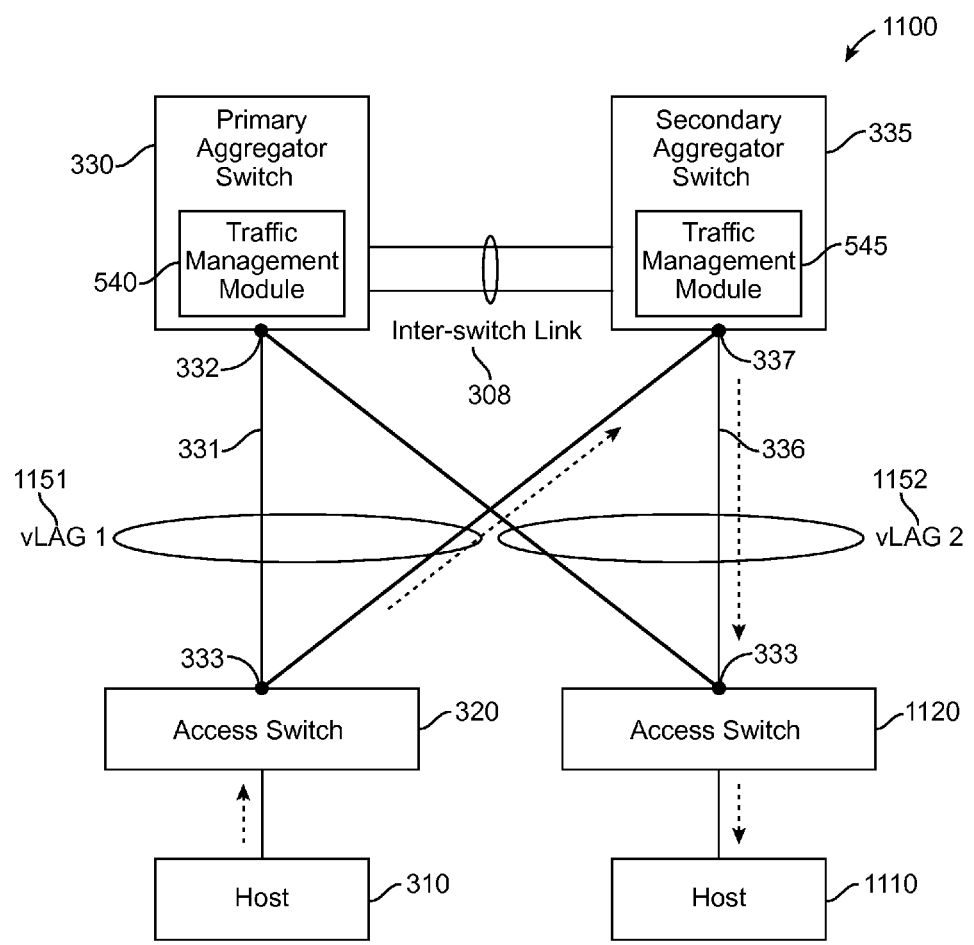
FIG. 13 is a block diagram of the system of FIG. 11 shown for yet another example scenario, according to one embodiment of the invention.

FIG. 13 is a block diagram of the system of FIG. 12 shown for a follow up example scenario, according to one embodiment of the invention. In this example, if the network traffic uses the dashed line path, the network traffic will not be broken while reload of the primary aggregator switch 330 occurs. In one example, the reload of the secondary aggregator switch 335 is similar to that of the primary aggregator switch 330.

Figure 14:
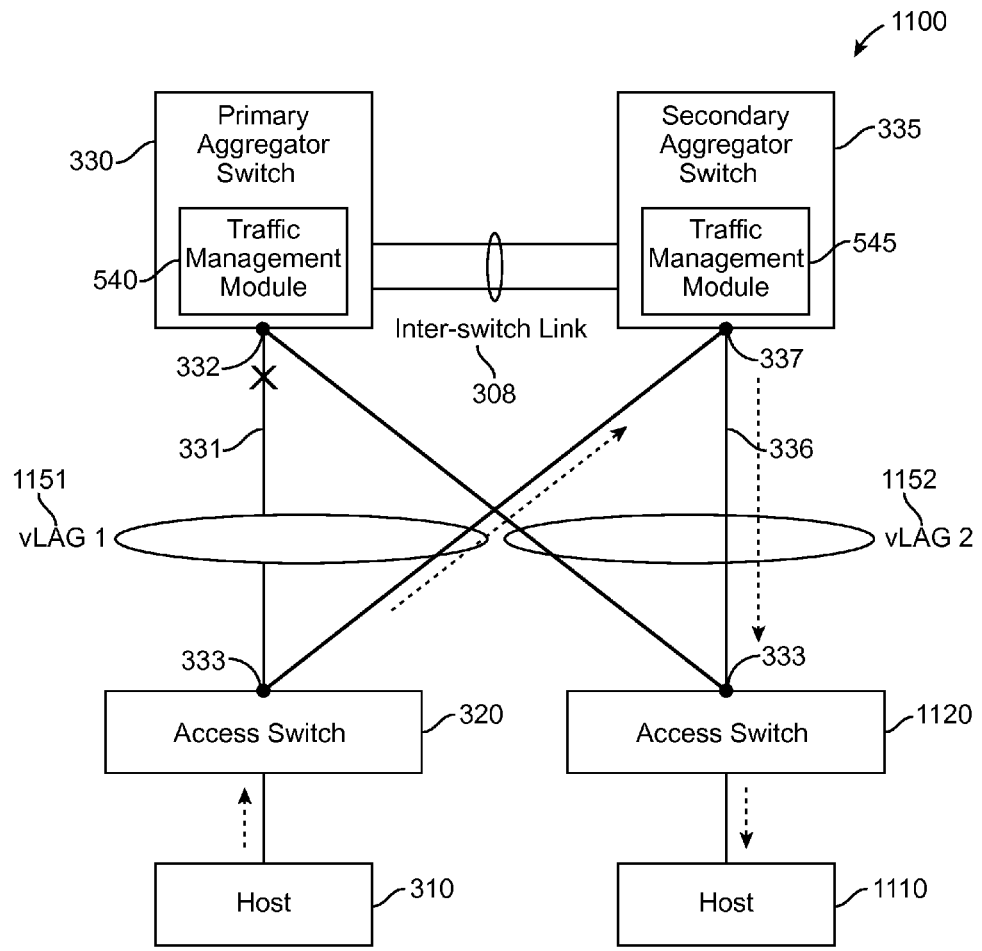
FIG. 14 is a block diagram of the system of FIG. 11 shown for still another example scenario, according to one embodiment of the invention.

FIG. 14 is a block diagram of the system of FIG. 11 shown for still another example scenario, according to one embodiment of the invention. In this example, the vLAG1 ports (e.g., network ports 332) on the primary aggregator switch 330 are shut down. The network traffic will follow the path of the dashed lines as illustrated in FIG. 14. In one embodiment, the vLAG1 network ports (e.g., network ports 337) on the secondary aggregator switch 335 enter a LOCAL_UP state and maintain a forwarding status. After the vLAG1 network ports (e.g., network ports 332) on the primary aggregator switch 330 link up, to avoid a network traffic loop, these network ports are placed in a block status first by the traffic management module 540. After vLAG 1 is formed and a forward ACK message is received from the peer switch, the underlying trunk will be placed in a forwarding state, and the network traffic will be recovered. In this example, the traffic break time is short. Flipping vLAG ports on the secondary aggregator switch 335 is similar.

Figure 15:
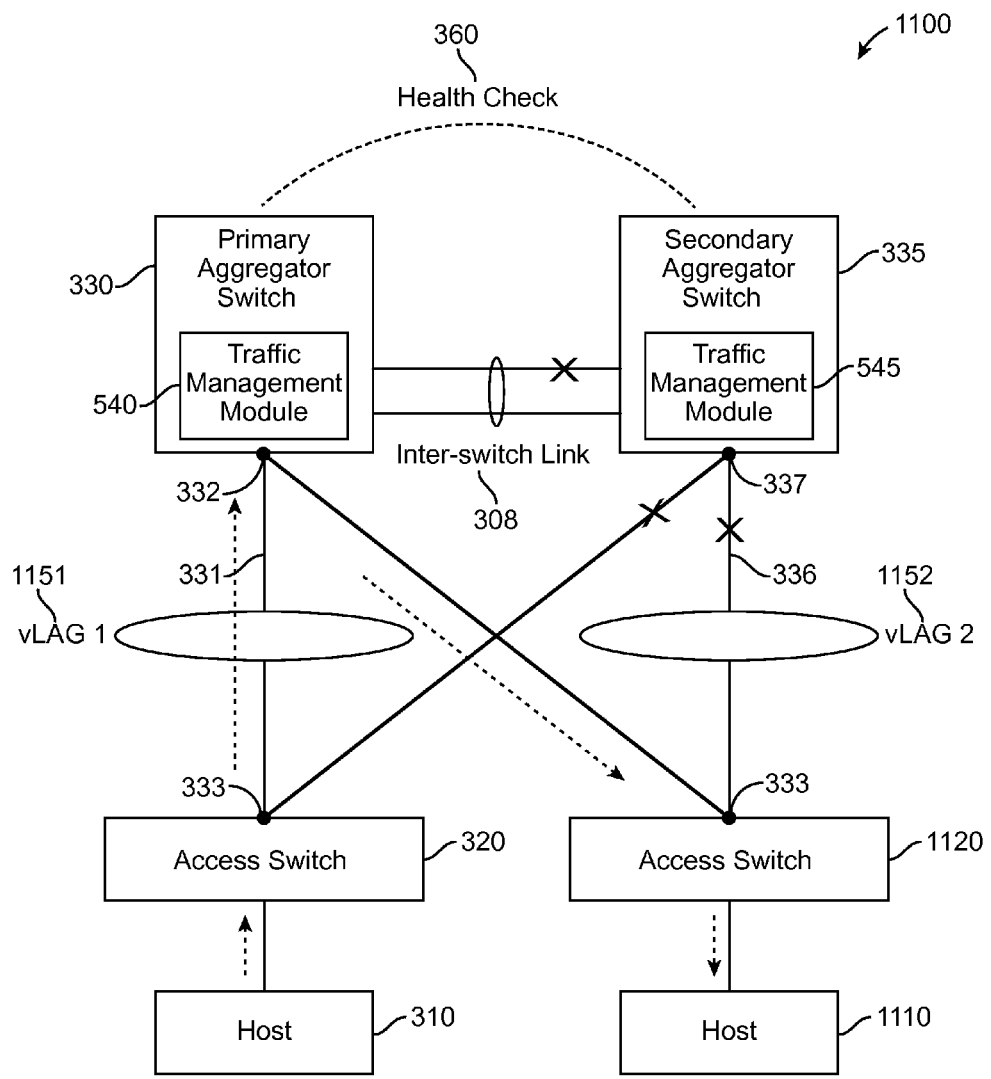
FIG. 15 is a block diagram of the system of FIG. 11 shown for another example scenario, according to one embodiment of the invention.

FIG. 15 is a block diagram of the system of FIG. 11 shown for another example scenario, according to one embodiment of the invention. In this example, if the ISL 308 incurs a failure, the secondary aggregator switch 335 will trigger health check 360 to query the primary aggregator switch 330 whether it exists (e.g., enabled) or not (e.g., failed/disabled). If the primary aggregator switch 330 replied to the query message in a set period of time (e.g., 3 seconds) or the ISL 308 trunk is still UP, the secondary aggregator switch 335 will operationally shut down all underlying LAG network ports. If the primary aggregator switch 330 cannot reply to the query message in the specified time period (e.g., 3 seconds), then the secondary aggregator switch 335 will forward all underlying LAG networking ports. If the ISL 308 is restored, a check is performed on the underlying LAG network ports first. If the underlying LAG network ports were shut down by the vLAG, then these network ports are brought to an UP state. In order to avoid network traffic looping, these network ports are maintained in a blocked state when link up occurs, until the vLAG formed and the forward ACK message is received. Then, the network ports are placed in a forwarding state.

Figure 16:
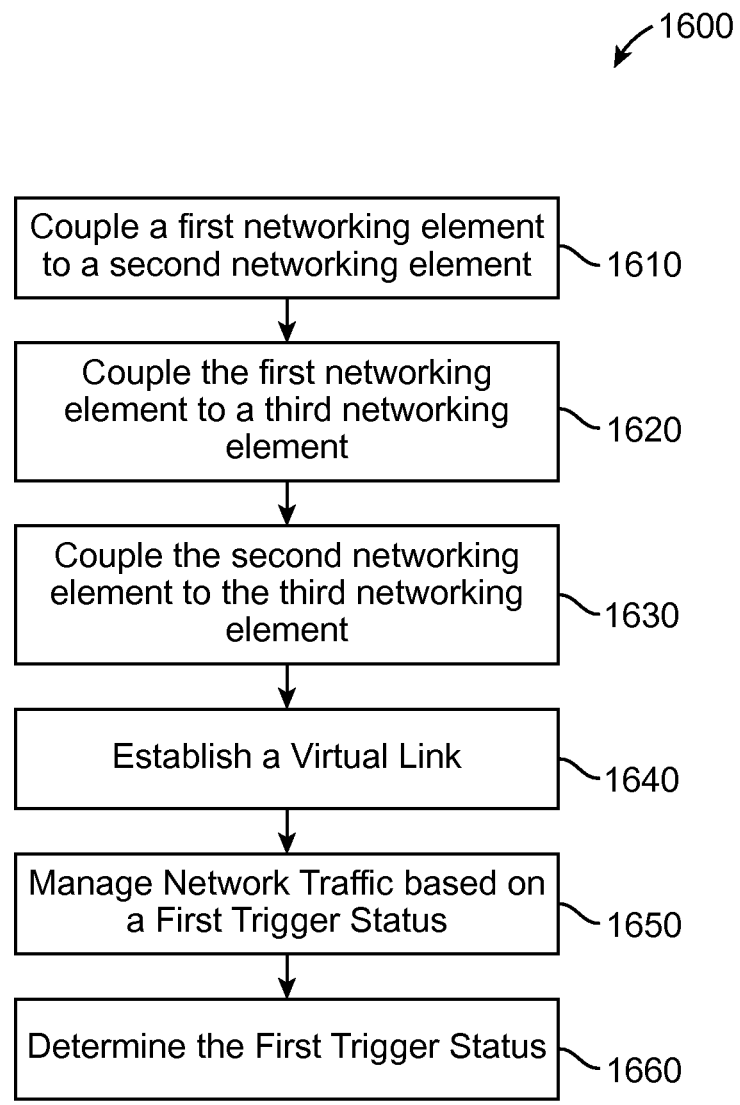
FIG. 16 is a block diagram showing a process for virtual link aggregation, in accordance with an embodiment of the invention.

FIG. 16 shows a block diagram of a process 1600 for avoiding network traffic loops in an absence of loop avoidance protocol such as STP according to one embodiment. Process 1600 may be performed in accordance with any of the environments depicted in FIGS. 1-15, among others, in various embodiments. Each of the blocks 1610-1660 of process 1600 may be performed by any suitable component of the operating environment. In one example, process 1600 may be partially or entirely performed by an aggregator switch (e.g., primary aggregator switch 330, secondary aggregator switch 335), a traffic management module (e.g., traffic management module 540/545), etc.

As shown in FIG. 16, in process block 1610, a first networking element is coupled to a second networking element (e.g., primary aggregator switch 330, secondary aggregator switch 335). In process block 1620, the first networking element is coupled to a third networking element (e.g., access switch 320). In process block 1630, the second networking element is coupled to the third networking element.

In processing block 1640, a virtual link is established. In process block 1650, the network traffic is managed by a traffic management module (e.g., traffic management module 540/545) by a first trigger status (e.g., an egress trigger status enabled/disabled) for a primary aggregator switch 330 or secondary aggregator switch 335. In process block 1660, the first trigger status is determined to be installed or not installed.

In one example, process 1600 may further include determining the first trigger status based at least in part on establishing of the first virtual link, wherein the first trigger status is set to enabled prior to the establishing of the first virtual link, and the first trigger status is set to disabled after the establishing of the first virtual link. In another example, process 1600 may include blocking at least a portion of the networking traffic from the first networking element when the first trigger status is set to enabled, and allowing at least a portion of the networking traffic of the first networking element to flow when the first trigger status is set to disabled.

In another example, process 1600 may include managing networking traffic for the second networking element based at least in part on a second trigger status, wherein at least a portion of the networking traffic from the second networking element is blocked when the second trigger status is set to enabled, and at least a portion of the networking traffic from the second networking element flows when the second trigger status is set to disabled. Determining the second trigger status based at least in part on the establishing of the first virtual link and, wherein prior to the establishing of the first virtual link the second trigger status is set to disabled, and after the establishing of the first virtual link the second trigger status is set to enabled.

In another example, process 1600 may include sending a first query message from the first networking element to the second networking element using the first link, wherein the establishing of the first virtual link is based at least in part on the first networking element receiving a response to the first query message from the second networking element, and activating a first event, wherein the establishing of the first virtual link is based on the first networking element receiving a response to the first query message from the second networking element prior to the activation of the first event, wherein the first plurality of networking ports are enabled upon detecting the activation of the first event.

In another example, process 1600 may include initiating a health check process based on the activation of the first event, disabling the first plurality of networking ports upon the health check process indicating that the second networking element is active, and enabling the first plurality of networking ports upon the health check process indicating that the second networking element is inactive.

According to various embodiments, the process 1600 may be performed by a system, computer, or some other device capable of executing commands, logic, etc., as would be understood by one of skill in the art upon reading the present descriptions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A virtual aggregation link system comprising:
   a primary aggregation switch;

a secondary aggregation switch coupled to the primary aggregation switch with a first link that comprises an inter-switch link;

a first access switch coupled to the primary aggregation switch with a second link and the secondary aggregation switch with a third link, the first access switch establishing a first virtual link with each one of the primary aggregation switch and the secondary aggregation switch via a virtual link aggregation group (vLAG) domain; and program instructions, embodied with one or more computer-readable storage devices for execution by one or more processors, the embodied program instructions comprising:

program instructions to manage networking traffic from the primary aggregation switch based at least in part on a first trigger status, wherein the first trigger status comprises a first egress trigger installation status; and program instructions to determine the first trigger status based at least in part on the establishing of the first virtual link.

2. The system of claim 1, wherein the embodied program instructions further comprise:

program instructions to set the first trigger status to enabled prior to the establishing of the first virtual link; and program instructions to set the first trigger status to disabled after the establishing of the first virtual link.

3. The system of claim 2, wherein the program instructions to manage networking traffic from the primary aggregation switch based at least in part on the first trigger status comprise:

program instructions to block at least a portion of the networking traffic from the primary aggregation switch when the first trigger status is set to enabled; and program instructions to allow at least a portion of the networking traffic of the primary aggregation switch to flow when the first trigger status is set to disabled.

4. The system of claim 3, wherein the primary aggregation switch includes a first plurality of networking ports, the secondary aggregation switch includes a second plurality of networking ports, and the first access switch includes a third plurality of networking ports, and wherein the first virtual link is established using the third link and the second link.

5. The system of claim 4, wherein the embodied program instructions further comprise:

program instructions to manage networking traffic for the secondary aggregation switch based at least in part on a second trigger status, comprising:

program instructions to block at least a portion of the networking traffic from the secondary aggregation switch when the second trigger status is set to enabled, wherein the second trigger status comprises a second egress trigger installation status; and program instructions to allow at least a portion of the networking traffic from the secondary aggregation switch to flow when the second trigger status is set to disabled.

6. The system of claim 5, wherein the embodied program instructions further comprise:

program instructions to determine the second trigger status based at least in part on the establishing of the first virtual link;

program instructions to set the second trigger status to disabled prior to the establishing of the first virtual link;

program instructions to set the second trigger status to enabled, after the establishing of the first virtual link; and program instructions to send a first query message from the primary aggregation switch to the secondary aggregation switch using the first link, wherein the establishing of the first virtual link is based at least in part on the first networking element receiving a response to the first query message from the second networking element.

7. A computer-useable storage medium for virtual link aggregation, the computer-useable storage medium having program instructions embodied therewith, the program instructions executable by one or more processors of a computer system to cause the one or more processors to perform a method comprising:

coupling a primary aggregation switch to a secondary aggregation switch using a first link that comprises an inter-switch link;

coupling the primary aggregation switch to an access switch using a second link;

coupling the secondary aggregation switch to the access switch using a third link;

establishing a first virtual link between the access switch and each one of the primary aggregation switch and the secondary aggregation switch via a virtual link aggregation group (vLAG) domain;

managing networking traffic from the primary aggregation switch based at least in part on a first trigger status, wherein the first trigger status comprises a first egress trigger installation status; and determining the first trigger status based at least in part on establishing of the first virtual link, wherein the first trigger status is set to enabled prior to the establishing of the first virtual link, and the first trigger status is set to disabled after the establishing of the first virtual link.

8. The computer-useable storage medium of claim 7, wherein managing network traffic from the primary aggregation switch based at least in part on the first trigger status comprises:

blocking at least a portion of the networking traffic from the primary aggregation switch when the first trigger status is set to enabled.

9. The computer-useable storage medium of claim 8, wherein the method further comprises:

managing networking traffic for the secondary aggregation switch based at least in part on a second trigger status, wherein the second trigger status comprises a second egress trigger installation status; and determining the second trigger status based at least in part on the establishing of the first virtual link, wherein prior to the establishing of the first virtual link the second trigger status is set to disabled, and after the establishing of the first virtual link the second trigger status is set to enabled.

10. The computer-useable storage medium of claim 7, wherein the primary aggregation switch includes a first plurality of networking ports, the secondary aggregation switch includes a second plurality of networking ports, and the access switch includes a third plurality of networking ports, and wherein the first virtual link is established using the third link and the second link.

11. The system of claim 1, wherein the stored program instructions further comprise program instructions to avoid networking traffic loops in the virtual aggregation link system in absence of a loop avoidance protocol.

12. The system of claim 1, wherein the stored program instructions further comprise program instructions to install the first egress trigger in response to a vLAG being formed in the virtual aggregation system, and the first egress trigger is used to break a network traffic loop.

13. The computer-useable storage medium of claim 7, wherein managing network traffic from the primary aggregation switch based at least in part on the first trigger status comprises:
　　allowing and at least a portion of the networking traffic of the primary aggregation switch to flow when the first trigger status is set to disabled.

14. The computer-useable storage medium of claim 10, further comprising:
　　sending a first query message from the primary aggregation switch to the secondary aggregation switch using the first link;
　　activating a first event, wherein the establishing of the first virtual link is based on the primary aggregation switch receiving a response to the first query message from the secondary aggregation switch prior to the activation of the first event, wherein the first plurality of networking ports are enabled upon detecting the activation of the first event;
　　initiating a health check process based on the activation of the first event;
　　disabling the first plurality of networking ports upon the health check process indicating that the secondary aggregation switch is active; and
　　enabling the first plurality of networking ports upon the health check process indicating that the secondary aggregation switch is inactive.

15. The computer-usable storage medium of claim 7, wherein managing networking traffic for the secondary aggregation switch based at least in part on the second trigger status comprises:
　　blocking at least a portion of the networking traffic from the secondary aggregation switch when the second trigger status is set to enabled.

16. The computer-usable storage medium of claim 7, wherein managing networking traffic for the secondary aggregation switch based at least in part on the second trigger status comprises:
　　allowing at least a portion of the networking traffic from the secondary aggregation switch to flow when the second trigger status is set to disabled.

* * * * *